United States Patent
Yamaguchi et al.

(10) Patent No.: US 6,724,716 B2
(45) Date of Patent: Apr. 20, 2004

(54) PHASE-CHANGE TYPE OPTICAL STORAGE MEDIUM HAVING MULTIPLE RECORDING LAYERS

(75) Inventors: Masataka Yamaguchi, Tsurugashima (JP); Takahiro Togashi, Tsurugashima (JP); Yoichi Okumura, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 193 days.

(21) Appl. No.: 10/059,129

(22) Filed: Jan. 31, 2002

(65) Prior Publication Data
US 2002/0146875 A1 Oct. 10, 2002

(30) Foreign Application Priority Data
Jan. 31, 2001 (JP) ..................... P2001-023195

(51) Int. Cl.$^7$ ................................. G11B 7/24
(52) U.S. Cl. ................. 369/275.2; 430/270.13
(58) Field of Search ................ 369/275.2, 275.1, 369/94, 281, 283, 280, 286; 428/64.1, 64.4; 430/270.13, 320, 321

(56) References Cited

U.S. PATENT DOCUMENTS

| | | | | |
|---|---|---|---|---|
| 5,764,619 A | * | 6/1998 | Nishiuchi et al. | 369/275.1 |
| 5,958,649 A | * | 9/1999 | Hirotsune et al. | 430/270.13 |
| 6,064,642 A | * | 5/2000 | Okubo | 369/275.1 |
| 6,221,455 B1 | * | 4/2001 | Yasuda et al. | 428/64.1 |
| 6,245,404 B1 | * | 6/2001 | Saito et al. | 428/64.1 |
| 6,456,584 B1 | * | 9/2002 | Nagata et al. | 369/275.2 |
| 6,514,591 B1 | * | 2/2003 | Nagata et al. | 428/64.4 |

FOREIGN PATENT DOCUMENTS

| | | | | |
|---|---|---|---|---|
| EP | 0-566-107 A1 | * | 10/1993 | 369/275.2 |
| EP | 0 957 477 A2 | | 11/1999 | |

* cited by examiner

Primary Examiner—Tan Dinh
(74) Attorney, Agent, or Firm—Sughrue Mion, PLLC (57) ABSTRACT

An information recording medium has a light transmissive layer, a first information recording layer, a transparent layer, and a second information recording layer sequentially stacked to reproduce information signals upon exposure of the light transmissive layer to laser light, wherein the first information recording layer comprises a first protective layer, a phase change recording film, and a second protective layer sequentially from the light transmissive layer, and the rate of power fluctuation between a reproducing light passing through a recorded region of the first information recording layer and that passing through an unrecorded region of the first information recording layer during reproduction of the information signals from the second information recording layer, are within 10%, whereby the information signals can be recorded/reproduced on/from the second information recording layer through the first information recording layer satisfactorily.

6 Claims, 7 Drawing Sheets

PHASE-CHANGE TYPE OPTICAL STORAGE MEDIUM HAVING MULTIPLE RECORDING LAYERS

BACKGROUND OF THE INVENTION

1. Field of the Invention

The present invention relates to an information recording medium having a plurality of information recording layers including information recording layers made of a phase change material.

2. Description of Related Art

Figure 11:
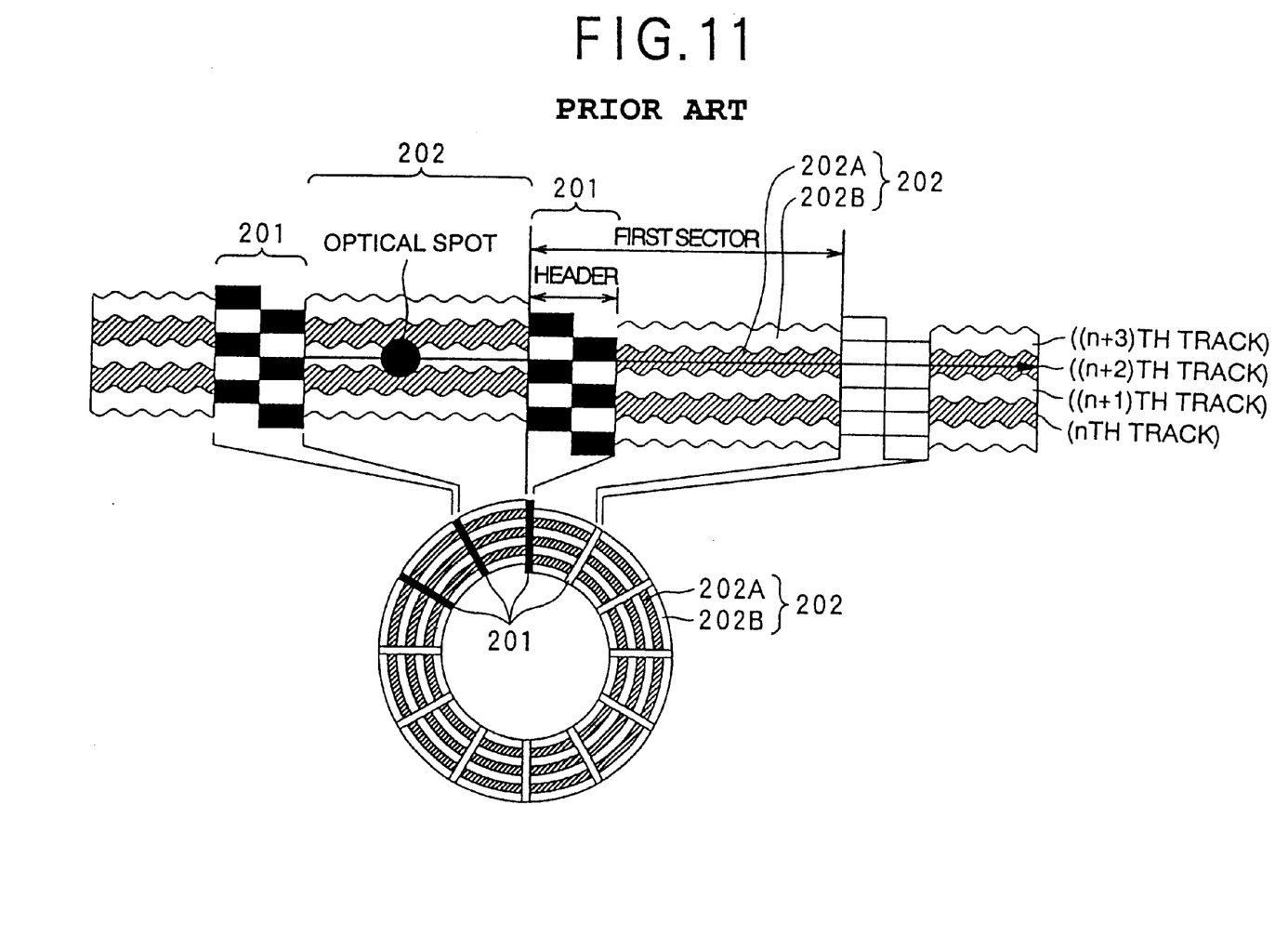
FIG. 11 is a diagram showing a track format of a DVD-RAM disk.

DVD-RAM disks are known as information recording media using a phase change material. FIG. 11 shows a track format of a DVD-RAM disk. As shown in the figure, the DVD-RAM disk includes headers 201 called "CAPA" (Complementary Allocated Pit Addressing) and lands/grooves 202, in which each land alternates with each groove in the radial direction, extend in the circumferential direction over the disk surface as guide grooves. In each header 201, address information is recorded as pre-pits, but no signals are recorded on a phase change recording film portion extending over the header 201, leaving the phase change recording film portion as-initialized i.e., crystalline. On the other hand, signals are recorded on the lands/grooves 202 in which both an amorphous region (amorphous marks are recorded) and a crystalline region (initialized with no amorphous marks recorded) are present. A recording medium having this land/groove structure for increasing the recording density includes the headers 201 at circumferential locations of the disk surface as described above, and the headers 201 are also used to adjust signals that control the switching of the optical-spot from a land 202A to a groove 202B and vice versa, for example.

Such an information recording medium stacking two or more information recording layers made of a phase change material are disclosed in, for example, EP 0957477 A2 and U.S. Pat. No. 6,221,455 B1.

In the case of an information recording medium having two information recording layers each being formatted analogously to the DVD-RAM track format, for example, a first information recording layer is stacked on a second information recording layer through an optically transparent layer. To record signals on the second information recording layer through the first information recording layer, or to reproduce signals from the second information recording layer through the first information recording layer, there is a difference in the amount of optical transmission between when the laser light transmits through a header of the first information recording layer and when the laser light transmits through a signal-recorded land/groove. Since it is difficult to manufacture a disk with headers such that the headers of the first information recording layer superimpose upon those of the second information recording layer, the optical transmission must be considered for a disk in which the headers of the first information recording layer do not superimpose upon those of the second information recording layer. Then, in such a disk, in accessing the second information recording layer, the laser light transmitting through the first information recording layer fluctuates in accordance with whether signals are recorded or unrecorded on the first information recording layer, i.e., for example, whether the laser light transmits through the header or through the recorded marks on the land/groove, independently of whether information is recorded or not on the second information recording layer. This fluctuation of the laser light in turn results in the fluctuation of recording power during recording on the second information recording layer, and further in the fluctuation of the level of reproduced signals during reproduction from the second information recording layer. When these fluctuations exceed their tolerances, the signals cannot be accurately recorded on the disk/reproduced from the disk.

SUMMARY OF THE INVENTION

An object of the invention is, therefore, to provide an information recording medium capable of satisfactorily recording/reproducing information signals on/from the second information recording layer through the first information recording layer having a phase change recording film.

The present invention provides an information recording medium having a light transmissive layer (103), a first information recording layer (L1), a transparent layer (102), and a second information recording layer (L2) sequentially stacked to reproduce information signals upon exposure of the light transmissive layer (103) to laser light, wherein the first information recording layer (L1) is provided with a first protective layer (11), a phase change recording film (1), and a second protective layer (12) sequentially from the light transmissive layer (103), and the rate of power fluctuation between a reproducing light passing through a recorded region of said first information recording layer (L1) and that passing through an unrecorded region of said first information recording layer (L1), during reproduction of the information signals from said second information recording layer (L2), are within 10%.

According to this invention, the rate of fluctuation between a reproducing light passing through a recorded regions of the first information recording layer and that passing through an unrecorded region of the first information recording layer, during reproduction of the information signals from the second information recording layer, are within 10%, whereby optical power fluctuation dependent upon whether signals are recorded or unrecorded on the first information recording layer can be suppressed when signals are recorded/reproduced on/from the second recording layer, and hence information signals can be recorded/reproduced on/from the second recording layer satisfactorily. Additionally, there is no need to adjust the positional relationship between the recorded region of the first information recording layer and that of the second information recording layer.

Assuming that the percentage of an area occupied by recorded marks in the recorded region of the first information recording layer (L1) is Aa, then $$0.2 \leq Aa \leq 0.5$$

may be satisfied.

In this case, each recorded mark alternates with each unrecorded portion when recorded, and each recorded mark may not be too small, whereby a practically applicable information recording medium can be obtained which is capable of satisfactorily recording/reproducing information signals on/from the second recording layer and which requires no adjustment of the positional relationship between the recorded region of the first information recording layer and that of the second information recording layer.

Assuming that the transmissivity of the recorded region of the first information recording layer (L1) is Tr, then $0.3 \leq Tr \leq 0.8$ may be satisfied, and assuming that the transmissivity of the unrecorded region of the first information recording layer (L1) is Tnr, then $0.3 \leq Tnr \leq 0.8$ may be satisfied.

In this case, since $0.3 \leq \mathrm{Tr} \leq 0.8$ and $0.3 \leq \mathrm{Tnr} \leq 0.8$, the transmissivity of the first information recording layer is not too small, whereby sufficiently intense signals can be obtained from the second information recording layer. Furthermore, the transmissivity of the first information recording layer is not too large, either, whereby the amount of light reflecting from the first information recording layer itself and the light absorption coefficient during recording on the first information recording layer can be suppressed. Hence, information signals can be recorded/reproduced satisfactorily.

An information recording medium may be provided which has a light transmissive layer (103), a first information recording layer (L1), a transparent layer (102), and a second information recording layer (L2) sequentially stacked to reproduce information signals upon exposure of the light transmissive layer (103) to laser light, wherein the first information recording layer (L1) is provided with a first protective layer (11), a phase change recording film (1), and a second protective layer (12) sequentially from the light transmissive layer (103), and assuming that the refractive index and extinction coefficient of a crystalline portion of the phase change recording film (1) are $n_{1c}$ and $k_{1c}$, respectively, and the refractive index and extinction coefficient of an amorphous portion of the phase change recording film (1) are $n_{1a}$ and $k_{1a}$, respectively, then $$(n_{1c}-n_{1a}) \times (k_{1c}-k_{1a}) < 0 \text{ and } |(n_{1c}+3/2 \times k_{1c})-(n_{1a}+3/2 \times k_{1a})| \leq 2.$$

In this case, since the condition $(n_{1c}-n_{1a}) \times (k_{1c}-k_{1a}) < 0$ and $|(n_{1c}+3/2 \times k_{1c})-(n_{1a}+3/2 \times k_{1a})| \leq 2$ is satisfied, optical power fluctuation dependent upon whether signals are recorded or unrecorded on the first information recording layer can be suppressed when signals are recorded/reproduced on/from the second recording layer, and hence information signals can be recorded/reproduced on/from the second recording layer satisfactorily. Additionally, there is no need to adjust the positional relationship between the recorded region of the first information recording layer and that of the second information recording layer.

An information recording medium may be provided which has a light transmissive layer (103), a first information recording layer (L1), a transparent layer (102), and a second information recording layer (L2) sequentially stacked to reproduce information signals upon exposure of the light transmissive layer to laser light, wherein the first information recording layer (L1) is provided with a first protective layer (11), a phase change recording film (1), and a second protective layer (12) sequentially from the light transmissive layer (103), and assuming that the number of protective films constituting the first protective layer (11) is I, the thickness of each of the protective films is di [nm] (where i is a natural number), the refractive index of each of the protective films is ni, the wavelength of the laser light is $\lambda$ [nm], and m is an integer, then the sum $\Sigma$ for all i running from 1 to I is given substantially as $$(m/2+1/4)-1/8 \leq \Sigma(di/(\lambda/ni)) \leq (m/2+1/4)+1/8,$$

and assuming that the number of protective films constituting the second protective layer (12) is J, the thickness of each of the protective films is dj [nm] (where j is a natural number), the refractive index of each of the protective films is nj, and k is an integer, then the sum $\Sigma$ for all j running from 1 to J is given substantially as $(k/2)-1/8 \leq \Sigma(dj/(\lambda/nj)) \leq (k/2)+1/8$.

According to this information recording medium, suitable thicknesses are selected for the protective films respectively constituting the first and second protective layers, whereby optical power fluctuation dependent upon whether signals are recorded or unrecorded on the first information recording layer can be suppressed when signals are recorded/reproduced on/from the second recording layer.

An information recording medium may be provided which has a light transmissive layer (103), a first information recording layer (L1), a transparent layer (102), and a second information recording layer (L2) sequentially stacked to reproduce information signals upon exposure of the light transmissive layer (103) to laser light, wherein the first information recording layer (L1) is provided with a first protective layer (11), a phase change recording film (1), and a second protective layer (12) sequentially from the light transmissive layer (103), and assuming that the number of protective films constituting the first protective layer (11) is I, the thickness of each of the protective films is di [nm] (where i is a natural number), the refractive index of each of the protective films is ni, the wavelength of the laser light is $\lambda$ [nm], and m is an integer, then the sum $\Sigma$ for all i running from 1 to I is given substantially as $$(m/2+1/4)-1/8 \leq \Sigma(di/(\lambda/ni)) \leq (m/2+1/4)+1/8,$$

and assuming that the number of protective films constituting the second protective layer (12) is J, the thickness of each of the protective films is dj [nm] (where j is a natural number), the refractive index of each of the protective films is nj, and k is an integer, then the sum $\Sigma$ for all j running from 1 to J is given substantially as $(k/2)-1/8 \leq \Sigma(dj/(\lambda/nj)) \leq (k/2)+1/8$, and assuming that the refractive index and extinction coefficient of a crystalline portion of the phase change recording film (1) are $n_{1c}$ and $k_{1c}$, respectively, and the refractive index and extinction coefficient of an amorphous portion of the phase change recording film (1) are $n_{1a}$ and $k_{1a}$, respectively, then $$(n_{1c}-n_{1a}) \times (k_{1c}-k_{1a}) < 0 \text{ and } |(n_{1c}+3/2 \times k_{1c})-(n_{1a}+3/2 \times k_{1a})| \leq 2.$$

In this case, optical power fluctuation dependent upon whether signals are recorded or unrecorded on the first information recording layer can be suppressed when signals are recorded/reproduced on/from the second recording layer.

While reference symbols referred to in the accompanying drawings are appended to the above description in parentheses to facilitate the understanding of the invention, this is not to limit the invention to embodiments shown in the drawings.

DETAILED DESCRIPTION OF THE PREFERRED EMBODIMENTS

Preferred embodiments of an information recording medium of the invention will now be described with reference to FIGS. 1 to 10.

In an information recording medium having a first information recording layer L1 and a second information recording layer L2, to record or reproduce information signals on or from the second information recording layer L2 through the first information recording layer L1, optical power fluctuates as mentioned above. For normal recording/ reproduction on/from the second information recording layer L2, desirable tolerances for recording/reproducing power fluctuations during recording/reproduction should range from 5 to 10% or less.

Here, let it be assumed as to the first information recording layer L1 that the reflectivity of a crystalline portion is $R_{1c}$, its transmissivity $T_{1c}$, and its absorption coefficient $A_{1c}$, and that the reflectivity of an amorphous portion is $R_{1a}$, its transmissivity $T_{1a}$, and its absorption coefficient $A_{1a}$. Let it also be assumed that the area occupied by the crystalline portions in the recorded region (land/groove) is Ac and that the area occupied by the amorphous portions is Aa (where Ac+Aa=1).

Assuming as to the second information recording layer L2 that the reflectivity of a crystalline portion is $R_{2c}$ and the reflectivity of an amorphous portion $R_{2a}$ (where $R_{2c}>R_{2a}$), then the following relationships are established.

Transmissivity of recorded portion of layer L1:

$$t_{1r}=(Ac \times T_{1c}+Aa \times T_{1a})/(Ac+Aa) \quad \text{Eq. 1}$$

Transmissivity of unrecorded portion of layer L1:

$$t_{1nr}=T_{1c}$$

Reflectivity of layer L2 when light transmits through recorded portion of layer L1:

$$r_{2r}=R_{2c} \times (Ac \times T_{1c}+Aa \times T_{1a})^2/(Ac+Aa)^2$$

Reflectivity of layer L2 when light transmits through unrecorded portion of layer L1:

$$r_{2nr}=R_{2c} \times T_{1c}^2$$

Power for recording on layer L2 when light transmits through recorded portion of layer L1:

$$Pw_{2r}=Pw \times t_{1r} \text{ (Pw: Incident recording power)}$$

Power for recording on layer L2 when light transmits through unrecorded portion of layer L1:

$$Pw_{2nr}=Pw \times t_{1nr}$$

Power for reproducing from layer L2 when light transmits through recorded portion of layer L1:

$$Pr_{2r}=Pr \times t_{1r}^2 \text{ (Pr: Incident reproducing power)}$$

Power for reproducing from layer L2 when light transmits through unrecorded portion of layer L1:

$$Pr_{2nr}=Pr \times t_{1nr}^2$$

Amount of fluctuation of power for recording on layer L2

$$\delta Pw_2=Pw_{2nr}-Pw_{2r}=Pw \times (t_{1nr}-t_{1r})$$

Rate of fluctuation of power for recording on layer L2

$$\Delta Pw_2=\delta Pw_2/Pw_{2r}=(t_{1nr}-t_{1r})/t_{1r}$$

Amount of fluctuation of power for reproducing from layer L2

$$\delta Pr_2=Pr_{2nr}-Pr_{2r}=Pr \times (t_{1nr}^2-t_{1r}^2)$$

Rate of fluctuation of power for reproducing from layer L2

$$\Delta Pr_2=\delta Pr_2/Pr_{2r}=(t_{1nr}^2-t_{1r}^2)/t_{1r}^2$$

Considering $\Delta Pr_2$, $$\Delta Pr_2=(t_{1nr}+t_{1r})/t_{1r} \times (t_{1nr}-t_{1r})/t_{1r}=(t_{1nr}+t_{1r})/t_{1r} \times \Delta Pw_2 \quad \text{Eq. 2}$$

is given, and $$(t_{1nr}+t_{1r})/t_{1r}>1 \quad \text{Eq. 3}$$

is also given, and hence the relationship $$\Delta Pw_2<\Delta Pr_2 \quad \text{Eq. 4}$$

is always satisfied.

In this embodiment, which is the recording medium stacking two information recording layers L1 and L2 through a transparent layer to reproduce information signals recorded on the second information recording layer L2 via the first information recording layer L1, the transmissivity Tnr of the unrecorded portion and the transmissivity Tr of the recorded portion in the first information recording layer L1 satisfy the following condition.

$$|\Delta Pr_2|=\left|\frac{\delta Pr_2}{Pr_2}\right|=\left|\frac{(t_{1nr}^2-t_{1r}^2)}{t_{1r}^2}\right|<0.1 \quad [\text{Eq. 5}]$$

This condition is based on the following experiments. Generally, the value $|\Delta Pr_2|$ does not take 0, and hence the level of reproduced signals from the second information recording layer L2 fluctuates depending on the recorded/ unrecorded states of the first information recording layer L1. In the experiments, a plurality of disks respectively having $\Delta Pr_2$=-0.05, -0.08, -0.12, and -0.15 were prepared for the experiments. During reproduction of the disk having $\Delta Pr_2$=-0.15, the phase lock maintained by the signal producing PLL is lost when the laser light beam has moved from the recorded to the unrecorded portion of the first information recording layer L1, hence resulting in failure to read data. The same phenomenon was observed in the disk having $\Delta Pr_2$=-0.12. However, the disks respectively having $\Delta Pr_2$=-

0.05 and −0.08 exhibited no such phenomenon, hence reproducing signals satisfactorily.

The area Aa occupied by the amorphous portions in the lands/grooves is within the following range.

$$0.2 \leq Aa \leq 0.5 \qquad \text{Eq. 6}$$

Hence, it is when Aa=0.5 that the largest difference in transmissivity is observed between the headers and the lands/grooves. This is observed when the area ratio of the crystalline to the amorphous portions in the signal-recorded lands/grooves is 1:1.

The rates of laser power fluctuation $\Delta Pw_2$ and $\Delta Pr_2$ for some conventional disks are calculated below when Aa=0.5.

For example, in some conventional disks, the transmissivity of the first information recording layer is set to 45% for the crystalline portion and 70% for the amorphous portion. When such an information recording layer is adopted as an address section comprised of a mirror section, the transmissivity $t_{1nr}$ (equaling the transmissivity of the crystalline portion) of the address section is 45% and the transmissivity $t_{1r}$=(45+70)/2 of the signal-recorded portion is 57.5%, resulting in a difference of 12.5%. The rates of laser power fluctuation under this condition are given by $$\Delta Pw_2 = (t_{1nr} - t_{1r})/t_{1r} = (45 - 57.5)/57.5 = -12.5/57.5 = -21.7\% \ \Delta Pr_2 =$$
$$(t_{1nr}^2 - t_{1r}^2)/t_{1r}^2 = (45^2 - 57.5^2)/57.5^2 = -38.7\% \qquad \text{Eq. 7}$$

These values are far beyond their tolerances, hence affecting the recording/reproducing performance. In the conventional disk, to solve this problem, i.e., to avoid fluctuation in transmissivity due to the recorded/unrecorded states of the first information recording layer, it is known that dummy signals are recorded on the first information recording layer in advance such that an area where the dummy signals are recorded occupies 20 to 50% of the total area of the first information recording layer. Although this technique is effective when guide grooves are formed over the total surfaces of the information recording layers, this technique may not be so when address signals are present as pre-pits in the mirror section as in a DVD-RAM, hence resulting in errors during reading of the address signals, for example. Even if the dummy signals are recorded successfully to give no effect on the address signals, they must be recorded over the entire surface of every disk at the time of its shipment or formatting, and hence this technique is not practical.

In the conventional disk, if no dummy signals are recorded on the first information recording layer, signals are recorded on the second information recording layer by controlling signal recording such that whenever signals are recorded on a region of the second information recording layer, the signals are also recorded on the corresponding region of the first information recording layer. However, such a technique still requires that signals be recorded on the address section in the above-mentioned disk having an address section, and this restriction complicates access to the disk, hence leading to an increase in the cost of its drive.

Next, another conventional disk will be discussed. It is assumed that the transmissivity of the first information recording layer in this disk is set to 62.6% for the crystalline portion and 80.4% for the amorphous portion. In this case, the transmissivity of the address portion (equaling the transmissivity of the crystalline portion) is 62.6% and that of the signal-recorded portion is (62.6+80.4)/2=71.5%, resulting in a difference of 8.9%. The rates of laser power fluctuation under this condition are given by $$\Delta Pw_2 = (t_{1nr} - t_{1r})/t_{1r} = (62.6 - 71.5)/71.5 = -8.9/71.5 = -12.4\% \ \Delta Pr_2 =$$
$$(t_{1nr}^2 - t_{1r}^2)/t_{1r}^2 = (62.6^2 - 71.5^2)/71.5^2 = -23.3\% \qquad \text{Eq. 8}$$

These values are far beyond their tolerances, hence affecting the recording/reproducing performance.

It is understood that laser power fluctuates so largely in these examples that satisfactory recording/reproducing cannot be performed as to the second information recording layer.

In contrast to these examples, the information recording medium of the invention allows information signals to be recorded/reproduced satisfactorily on/from the second information recording layer through the first information recording layer having a phase change recording film.

Figure 1:
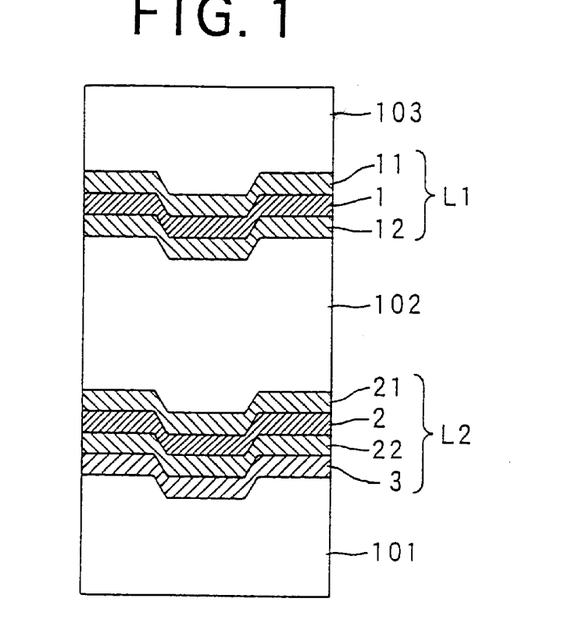
FIG. 1 is a sectional view showing a basic configuration of an information recording medium according to a first embodiment of the invention.

FIG. 1 is a sectional view showing an information recording medium according to a first embodiment of the invention. As shown in the figure, the information recording medium is comprised of a substrate 101, a second information recording layer L2, a transparent layer 102, a first information recording layer L1, and a light transmissive layer 103. Information is recorded on the first and second information recording layers L1 and L2 independently of each other.

The first information recording layer L1 is comprised of a second dielectric protective film 12, a phase change recording film 1, and a first dielectric protective film 11. The second information recording layer L2 is comprised of a reflector film 3, a second dielectric protective film 22, a phase change recording film 2, and a first dielectric protective film 21.

It should be noted that the second information recording layer L2 may be recordable and also reproducible only, and that information signals are recorded/reproduced upon exposure of the light transmissive layer 103 to laser light. The same applies to second and third embodiments which will be described below.

Figure 2:
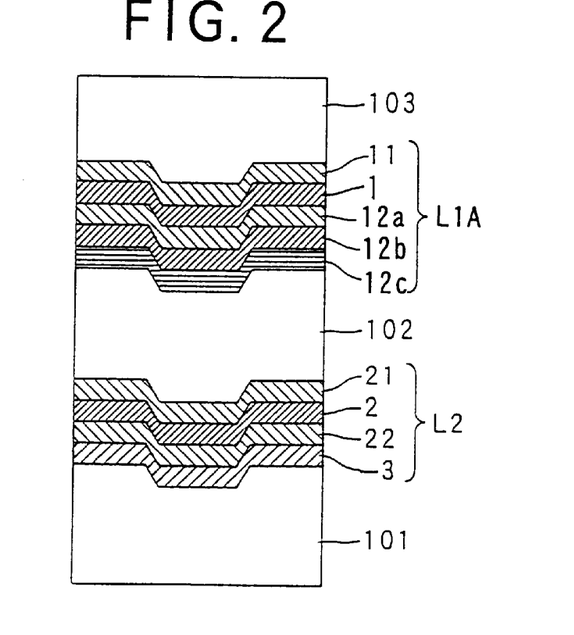
FIG. 2 is a sectional view showing an information recording medium according to a second embodiment of the invention.

FIG. 2 is a sectional view showing an information recording medium according to a second embodiment of the invention. As shown in the figure, the information recording medium is comprised of a substrate 101, a second information recording layer L2, a transparent layer 102, a first information recording layer L1A, and a light transmissive layer 103. The first information recording layer L1A is comprised of a fourth dielectric protective film 12c, a third dielectric protective film 12b, a second dielectric protective film 12a, a phase change recording film 1, and a first dielectric protective film 11. The second information recording layer L2 is comprised of a reflector film 3, a second dielectric protective film 22, a phase change recording film 2, and a first dielectric protective film 21.

Figure 3:
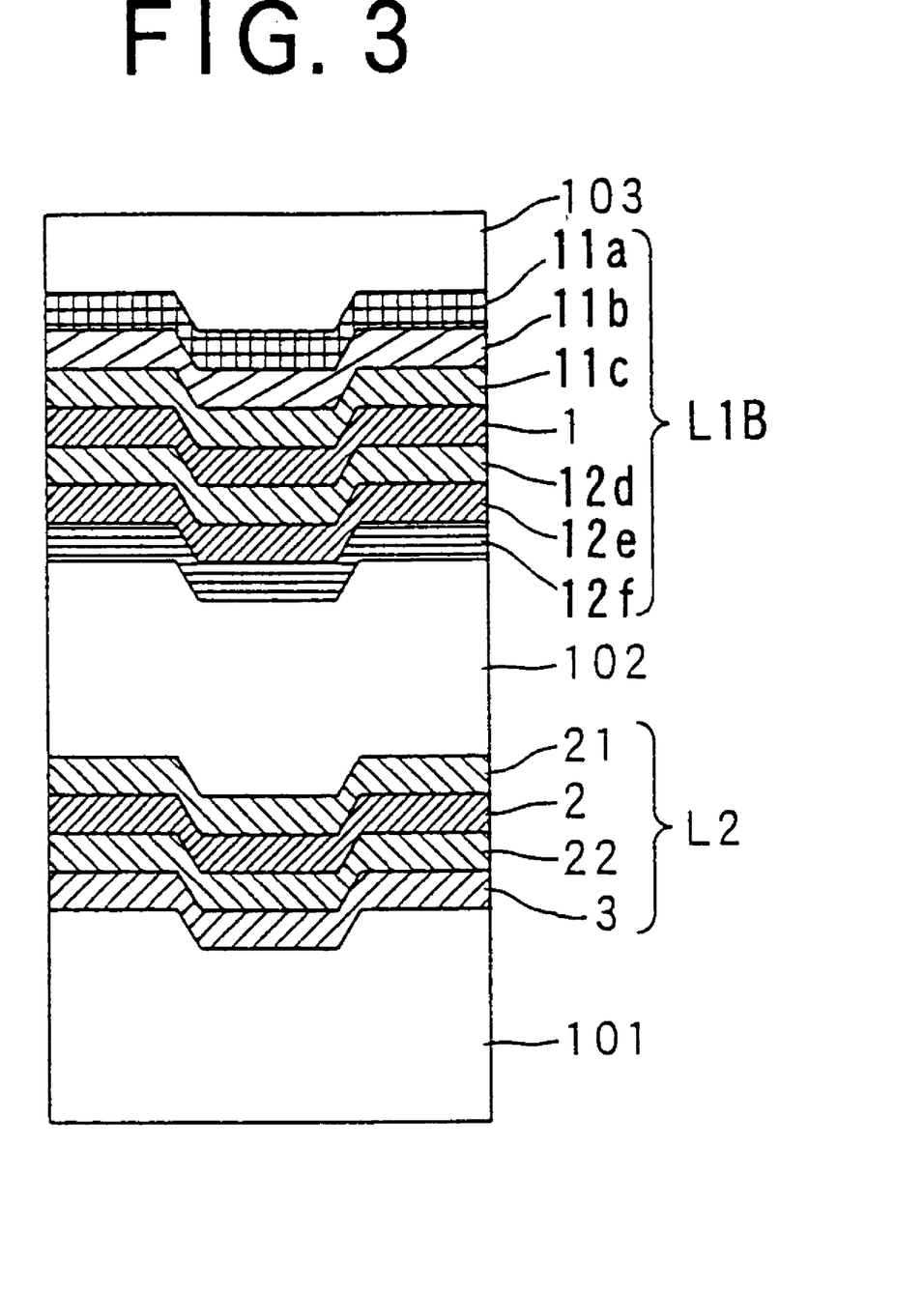
FIG. 3 is a sectional view showing an information recording medium according to a third embodiment of the invention.

FIG. 3 is a sectional view showing an information recording medium according to a third embodiment of the invention. As shown in the figure, the information recording medium is comprised of a substrate 101, a second information recording layer L2, a transparent layer 102, a first information recording layer L1B, and a light transmission layer 103. The first information recording layer L1B is comprised of a sixth dielectric protective film 12f, a fifth dielectric protective film 12e, a fourth dielectric protective film 12d, a phase change recording film 1, a third dielectric protective film 11c, a second dielectric protective film 11b, and a first dielectric protective film 11a. The second information recording layer L2 is comprised of a reflector film 3, a second dielectric protective film 22, a phase change recording film 2, and a first dielectric protective film 21.

A fundamental solution to the above problem which the information recording media according to the first to third embodiments should find is to reduce the difference in transmissivity between the recorded and unrecorded portions of the first information recording layer L1 to make its influence on the recording/reproducing of information signals on/from the second information recording layer L2 negligible. The invention is featured in the film forming structure and material selection for preparing the first information recording layer L1 in order to suppress the difference in transmissivity between the recorded and unrecorded portions of the first information recording layer. Notably, the invention is not limited to the information recording media according to the first to third embodiments as to the number of dielectric protective films, etc.

Specific configurations of the information recording media of the invention will be described below.

In each embodiment, as to the phase change recording film of the first information recording layer, its refractive index $n_{1c}$ and extinction coefficient $k_{1c}$ in the crystalline state, and its refractive index $n_{1a}$ and extinction coefficient $k_{1a}$ in the amorphous state satisfy the following condition.

$$(n_{1c}-n_{1a})\times(k_{1c}-k_{1a})<0 \qquad \text{Eq. 9}$$

and $$\left|\left(n_{1c}+\frac{3}{2}k_{1c}\right)-\left(n_{1a}+\frac{3}{2}k_{1a}\right)\right| \leq 2 \qquad \text{[Eq. 10]}$$

Figure 4:
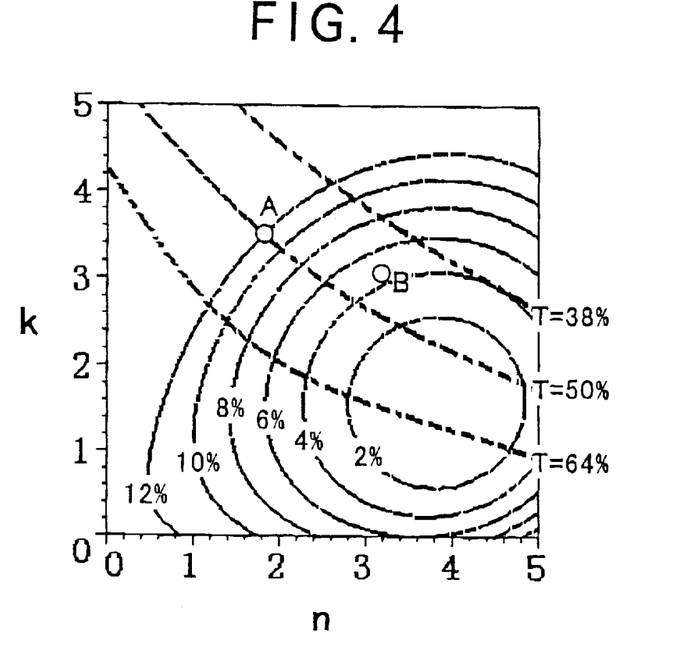
FIG. 4 is a diagram showing reflectivities and transmissivities calculated using the optical constants (n, k) of a phase change recording film as variables in a three-layered structure comprised of PC substrate/dielectric protective film/phase change recording film/dielectric protective film as a first information recording layer.
Figure 5:
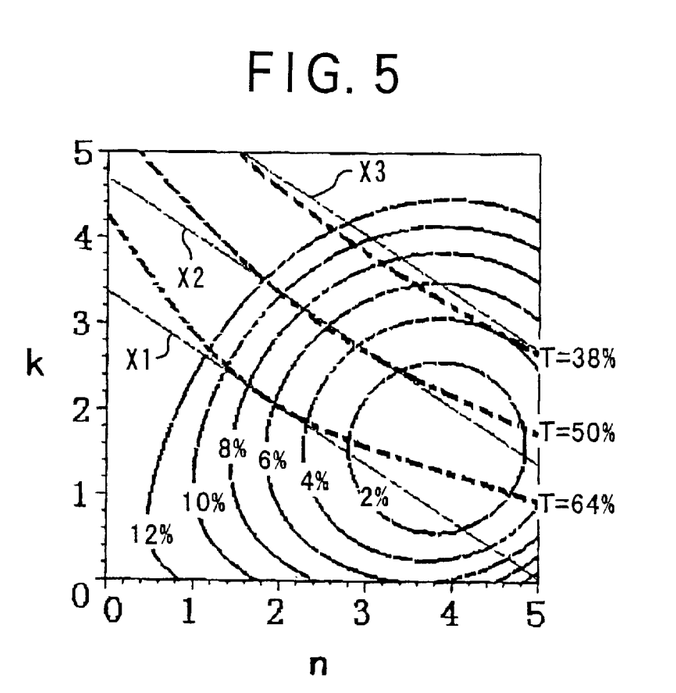
FIG. 5 is a diagram showing reflectivities and transmissivities calculated using the optical constants (n, k) of a phase change recording film as variables in a three-layered structure comprising PC substrate/dielectric protective film/ phase change recording film/dielectric protective film as the first information recording layer.

Here, FIGS. 4 and 5 show calculated reflectivities and transmissivities of the first information recording layer having a three-layered structure comprised of PC substrate/ dielectric film/phase change recording film/dielectric film. The calculation is performed by appropriately selecting the thickness of each film and using the optical constants (n, k) of the phase change recording film as variables. The optical constants (n, k) so paired as to set the reflectivity to 2, 4, 6, 8, 10, and 12% are plotted as substantially concentric curves. The optical constants (n, k) so paired as to set the transmissivity T to 38, 50, and 64% are plotted as broken lines. As to the parameters used for the calculation, the wavelength is 405 nm, the thickness of the phase change recording film is 6 nm, the optical constant of the dielectric film ($ZnS.SiO_2$) is n=2.3, and the optical constant of the PC substrate is n=1.61.

Let a recording medium be considered whose crystalline portion has a transmissivity of 50%, for example. The optical constants (n, k) of the crystalline portion stays on a line T=50%. To contain the rate of power fluctuation of the reproducing light ($\Delta Pr_2$) within ±10% for such a transmissivity, (n, k) of the amorphous portion must be found between T=45% and T=56% when Aa=0.5, and between T=38% and T=64% when Aa=0.2. That is, as long as (n, k) of the amorphous portion is found between T=38% and T=64%, the rate of power fluctuation of the reproducing light ($\Delta Pr_2$) can theoretically be contained within ±10%.

On the other hand, to ensure signal intensity for satisfactory reproduction, the first information recording layer is required to maximize the difference in reflectivity between its crystalline and amorphous portions. To obtain signals which are practically intense enough for satisfactory recording/reproduction, it is preferred that $R_{1c}$ (the reflectivity of the unrecorded portion (the crystalline portion) of the first information recording layer L1) be in the order of 10% and that $R_{1a}$ (the reflectivity of the recorded mark (the amorphous portion) of the first information recording layer L1) be minimized. Ideally, $R_{1a}$=0%. When $R_{1c}$ is large, laser power required for recording is so large that practically no information can be recorded. Notably, $R_{1c}$=10% and $R_{1a}$=4% have been achieved with the currently available materials. In FIG. 4, a point A indicates (n, k)=(nc, kc)=(1.8, 3.5) of the crystalline portion and a point B indicates (n, k)=(na, ka)=(3.2, 3.0) of the amorphous portion.

In FIG. 4, the (transmissivity, reflectivity) of the crystalline portion at the point A and of the amorphous portion at the point B are (50%, 12%) and (46%, 4%), respectively. The transmissivities are within their tolerance, and the reflectivities are also sufficient. Here, let a straight line connecting the points A and B be considered. Since it is a zone extending to the lower right of the figure that satisfies the transmissivity requirement, the inclination {=(kc−ka)/ (nc−na)} of the straight line connecting the point A (nc, kc) and point B (na, ka) must be negative. That is, the condition (kc−ka)/(nc−na)<0 (or (kc−ka)×(nc−na)<0) must be satisfied.

Moreover, obliquely depicted straight lines in FIG. 5 indicate a straight line X1 (n+1.5×k=7.05−2), a straight line X2 (n+1.5×k=1.8+1.5×3.5=7.05), and a straight line X3 (n+1.5×k=7.05+2). The straight line X2 is drawn to pass through (nc, kc)=(1.8, 3.5) and thus satisfy n+3/2×k=nc+3/ 2×kc.

When Tc=0.5 (T=50%) and Aa=0.2, it is the zone between T=38% and T=64% that satisfies the above condition. Any (n, k) under this condition substantially coincides with a zone interposed between the straight lines X1 and X3.

Furthermore, assuming that the ratio of the area occupied by the recorded marks and of the area occupied by the unrecorded portions in the recorded region of the first information recording layer L1 are Aa and Ac, respectively, then $$0.2 \leq Aa \leq 0.5$$

$$Aa+Ac=1$$

are given.

Here, while Aa is the ratio of the area occupied by the marks recorded on guide grooves such as grooves or lands, these marks are recorded such that a recorded portion alternates with an unrecorded portion, and the area occupied by these marks does not exceed the area occupied by the unrecorded portions, and hence Aa≤0.5 is established. Moreover, when each recorded mark is too small, no signal can be produced therefrom, and thus, 0.2<Aa should be satisfied.

Furthermore, the transmissivity Tnr of the unrecorded portion and the transmissivity Tr of the recorded portion in the first information recording layer L1 satisfy $$0.3 \leq Tnr \leq 0.8$$

$$0.3 \leq Tr \leq 0.8$$

Here, a reproduced signal from the second information recording layer L2 can be expressed as a value obtained by multiplying the square of the transmissivity of the first information recording layer L1 and the reflectivity of the second information recording layer L2 with the amount of incident light. When the first information recording layer L1 has too small a transmissivity, the level of signals reproduced from the second information recording layer L2 becomes too small and thus insufficient. Conversely, when the recording layer L1 has too large a transmissivity, the amount of light reflecting from itself and the light absorption coefficient during recording on itself are decreased to such a small extent that satisfactory reproduction and recording cannot be achieved. This is why any reproduced signal from the second information recording layer L2 must satisfy 0.3≤Tnr≤0.8 and 3≤Tr≤0.8.

Next, the relationship between the transmissivity $T_{1c}$ of the crystalline portion and the transmissivity $T_{1a}$ of the amorphous portion (recorded mark), and the area Aa occupied by the amorphous portions will be described below.

The rate of fluctuation ($\Delta Pr_2$) of light reflecting from the second information recording layer L2 after having passed through the first information recording layer L1 is given, provided that the light has passed through the recorded region of the first information recording layer L1, by $$\Delta Pr_2 = \frac{\delta Pr_2}{Pr_2} = \frac{(t_{1nr}^2 - t_{1r}^2)}{t_{1r}^2} = \frac{T_{1c}^2 - (AcT_{1c} + AaT_{1a})^2}{(AcT_{1c} + AaT_{1a})^2} \quad [\text{Eq. 11}]$$

where $Aa+Ac=1$.

When a value K is used for the rate of fluctuation ($\Delta Pr_2$) of the reflected light (i.e., when $\Delta Pr_2 = K$), $\Delta Pr_2$ can be written in the form of quartic equations for $T_{1a}$ (the transmissivity of the amorphous portion), where $T_{1c}$ (the transmissivity of the crystalline portion) and Aa (the area occupied by the amorphous portions (recorded marks)) are the coefficients. The following four solutions $T_{1a}$ are obtained. Eq. 12

$$T_{1a} = \frac{-(1+K)+(1+K)Aa+\sqrt{1+K}}{(1+K)Aa}T_{1c} \quad \text{Eq. (12-1)}$$

$$= \frac{-(1+K)+(1-Aa)+\sqrt{1+K}}{(1+K)Aa}T_{1c}$$

$$= \frac{1-\sqrt{1+K}\,(1-Aa)}{\sqrt{1+K}\,Aa}T_{1c}$$

$$T_{1a} = \frac{-(1+K)+(1+K)Aa-\sqrt{1+K}}{(1+K)Aa}T_{1c} \quad \text{Eq. (12-2)}$$

$$= \frac{-(1+K)+(1-Aa)-\sqrt{1+K}}{(1+K)Aa}T_{1c}$$

$$= -\frac{1+\sqrt{1+K}\,(1-Aa)}{\sqrt{1+K}\,Aa}T_{1c}$$

$$T_{1a} = -\frac{(1-K)-(1-K)Aa-\sqrt{1-K}}{(1-K)Aa}T_{1c} \quad \text{Eq. (12-3)}$$

$$= -\frac{(1-K)(1-Aa)-\sqrt{1-K}}{(1-K)Aa}T_{1c}$$

$$= \frac{1-\sqrt{1-K}\,(1-Aa)}{\sqrt{1-K}\,Aa}T_{1c}$$

$$T_{1a} = -\frac{(1-K)-(1-K)Aa+\sqrt{1-K}}{(1-K)Aa}T_{1c} \quad \text{Eq. (12-4)}$$

$$= -\frac{(1-K)(1-Aa)+\sqrt{1-K}}{(1-K)Aa}T_{1c}$$

$$= -\frac{1+\sqrt{1-K}\,(1-Aa)}{\sqrt{1-K}\,Aa}T_{1c}$$

Considering any values which $T_{1a}$, $T_{1c}$, Aa, and K can respectively take on, it is only the solutions of Eqs. (12-1) and (12-3) that are implementable. Eqs. (12-2) and (12-4) cannot give viable solutions because $T_{1a}<0$. That is, Eq. 13

$$T_{1a} = \frac{1-\sqrt{1+K}\,(1-Aa)}{\sqrt{1+K}\,Aa}T_{1c} \quad \text{Eq. (12-1)}$$

$$T_{1a} = \frac{1-\sqrt{1-K}\,(1-Aa)}{\sqrt{1-K}\,Aa}T_{1c} \quad \text{Eq. (12-3)}$$

are established.

Figure 6:
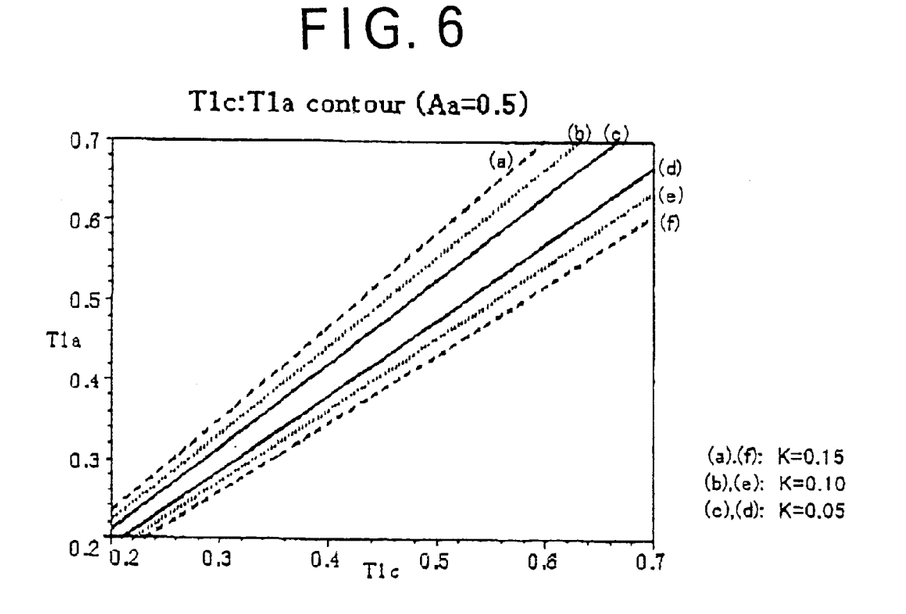
FIG. 6 is a diagram showing $\Delta Pr_2(=K)$ when Aa=0.5.
Figure 7:
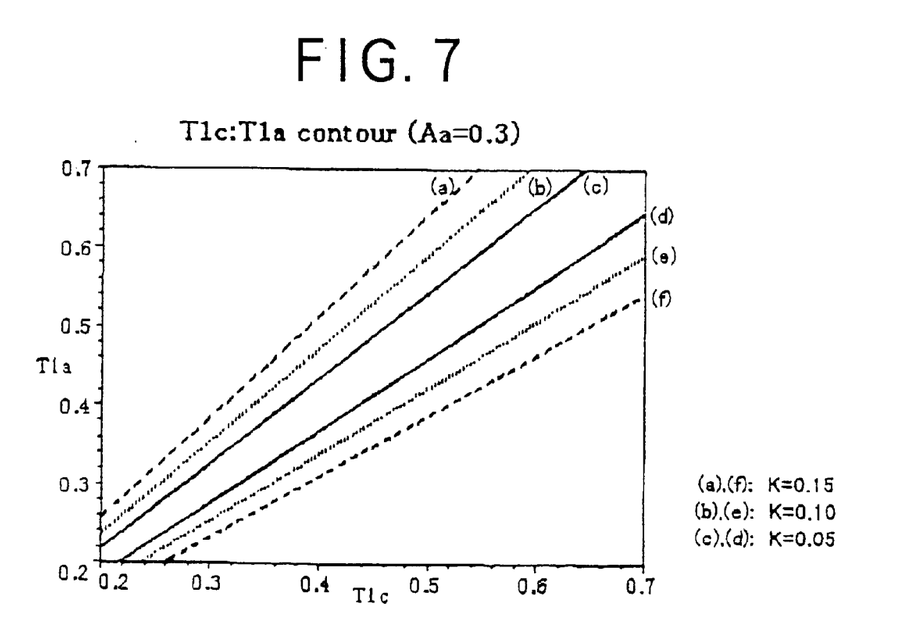
FIG. 7 is a diagram showing $\Delta Pr_2(=K)$ when Aa=0.3.

FIG. 6 shows $T_{1a}$ and $T_{1c}$ calculated for $\Delta Pr_2$ (=K)=0.05, 0.10, and 0.15 when Aa=0.5, while FIG. 7 shows the same when Aa=0.3. In FIGS. 6 and 7, straight lines (a) and (f) represent for $\Delta Pr_2$ (=K)=0.15, straight lines (b) and (e) for $\Delta Pr_2$ (=K)=0.10, and straight lines (c) and (d) for $\Delta Pr_2$ (=K)=0.05.

For example, in FIG. 6, when Aa=0.5 and with respect to any value for $T_{1c}$, $T_{1a}$ satisfying $-0.15 \leq \Delta Pr_2 \leq 0.15$ is indicated as a zone interposed between the two straight lines (a) and (f), $T_{1a}$ satisfying $-0.10 \leq \Delta Pr_2 \leq 0.10$ as a zone interposed between the two straight lines (b) and (e), and $T_{1a}$ satisfying $-0.05 \leq \Delta Pr_2 \leq 0.05$ as a zone interposed between the two straight lines (c) and (d). Furthermore, to satisfy $|\Delta Pr_2| \leq 0.10$ when $T_{1c}=0.50$ and Aa=0.5, $T_{1a}$ must be $0.383 < T_{1a} < 0.63$.

Figure 8:
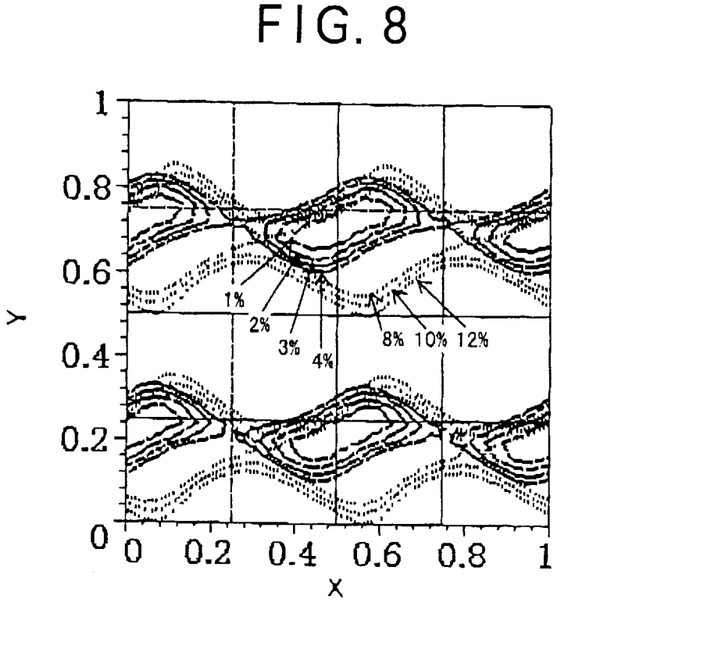
FIG. 8 is a diagram showing the relationship between the thickness and optical constants of dielectric protective films in the first embodiment.
Figure 9:
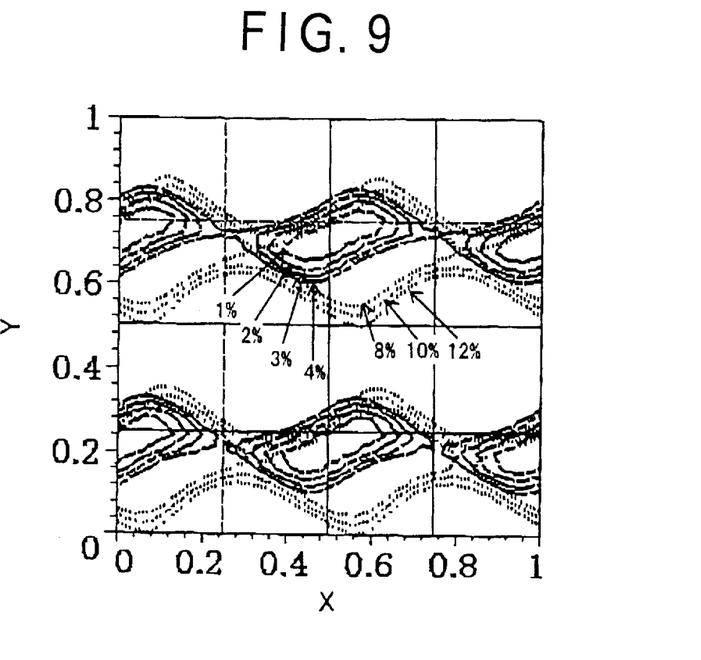
FIG. 9 is a diagram showing the relationship between the thickness and optical constants of dielectric protective films in the second embodiment.
Figure 10:
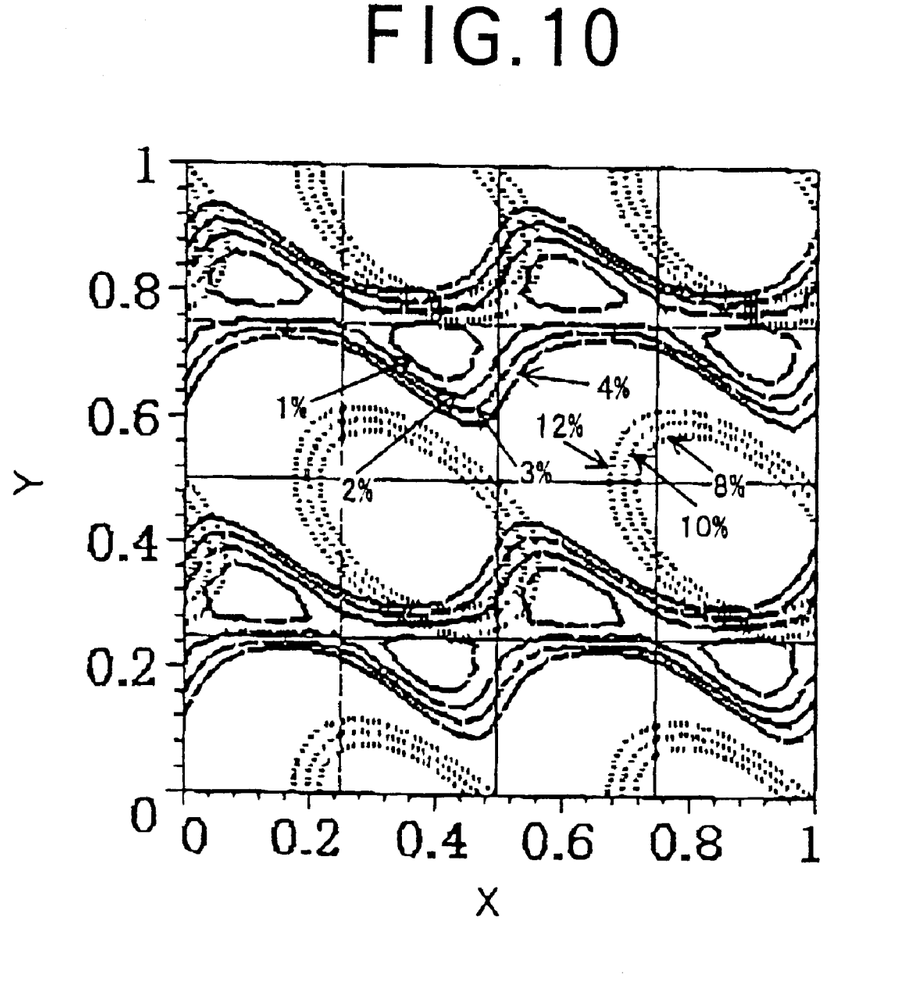
FIG. 10 is a diagram showing the relationship between the thickness and optical constants of dielectric protective films in the third embodiment.

FIGS. 8 to 10 show the relationship between the thickness and optical constants of the dielectric protective films.

FIG. 8, which corresponds to the configuration according to the first embodiment shown in FIG. 1, shows the case where the thickness of the phase change recording film 1 is 6 nm. The X axis indicates the value obtained by dividing the thickness of the dielectric film 12 by $\lambda/n$ (where n is the optical constant of the film 12). The Y axis indicates the value obtained by dividing the thickness of the first dielectric film 11 by $\lambda/n$ (where n is the optical constant of the film 11).

FIG. 9, which corresponds to the configuration according to the second embodiment shown in FIG. 2, shows the case where the thickness of the phase change recording film 1 is 6 nm. The X axis indicates the value obtained by dividing the thickness of the second dielectric film 12a by $\lambda/n$ (where n is the optical constant of the film 12a). The Y axis indicates the value obtained by dividing the thickness of the first dielectric film 11 by $\lambda/n$ (where n is the optical constant of the film 11). The thickness of the third dielectric film 12b is 104 nm (($\lambda/n$)×4/8), and that of the fourth dielectric film 12c is 131 nm (($\lambda/n$)×6/8).

FIG. 10, which corresponds to the configuration according to the third embodiment shown in FIG. 3, shows the case where the thickness of the phase change recording film 1 is 6 nm. The X axis indicates the value obtained by dividing the thickness of the fourth dielectric film 12d by $\lambda/n$ (where n is the optical constant of the film 12d). The Y axis indicates the value obtained by dividing the thickness of the first dielectric film 11a by $\lambda/n$ (where n is the optical constant of the film 11a). The thickness of the second dielectric film 11b is 182 nm (($\lambda/n$)×7/8), that of the third dielectric film 11c is 22 nm (($\lambda/n$) ×1/8), that of the fifth dielectric film 12e is 22 nm (($\lambda/n$)×1/8), and that of the sixth dielectric film 12f is 153 nm (($\lambda/n$)×7/8).

In each of FIGS. 8 to 10, such X and Y coordinates as to set the reflectivity of the crystalline portion to 8, 10, and 12% are plotted as thin broken lines, and such X and Y coordinates as to set the reflectivity of the amorphous portion to 1, 2, 3, and 4% as thick broken lines. A zone practically contributing to good reproduced signals is where both broken lines overlap.

According to FIG. 8, the zone where both broken lines overlap, for the first embodiment, is near {X=0, 1/2, 1} and {Y=1/4, 3/4}. That is, $\Sigma$\{thickness/($\lambda/n$)\}=0, 1/2, 1 (=k/2) as to the thickness of the dielectric film 12, and $\Sigma$\{thickness/($\lambda/n$)\}=1/4, 4/3 (=m/2+1/4) as to the thickness of the dielectric film 11.

According to FIG. 9, the zone where both broken lines overlap, for the second embodiment, is near {X=1/4, 3/4} and {Y=1/4, 3/4}. That is, $\Sigma$\{thickness/($\lambda/n$)\}=1/2+3/4+(1/4, 3/4)=6/4, 8/4=1+1/2, 2(=k/2) as to the thickness of the second dielectric film 12a, and $\Sigma$\{thickness/($\lambda/n$)\}=1/4, 4/3 (=m/2+1/4) as to the thickness of the first dielectric film 11.

According to FIG. 10, the zone where both broken lines overlap, for the third embodiment, is near (X, Y)=(0 to 1/8, 2/8 to 3/8), (3/8 to 5/8, 2/8 to 3/8), (7/8 to 1, 2/8 to 3/8), (0 to 1/8, 6/8 to 7/8), (3/8 to 5/8, 6/8 to 7/8). That is, Σ{thickness/(λ/n)}=1/8+7/8+(X, Y)=1+(X, Y) as to the thickness of the fourth dielectric film 12d, and Σ{thickness/(λ/n)}=7/8+1/8+(X, Y)=1+(X, Y) as to the thickness of the first dielectric film 11a.

Therefore, the zone where the broken lines overlap in each of FIGS. 8 to 10 satisfies the following relationships.

As to a first protective layer $$(m/2+1/4)-1/8 \leq \Sigma(di/(\lambda/ni)) \leq (m/2+1/4)+1/8 \quad \text{Eq. 14}$$

(where m is an integer, i is a natural number, di is the thickness of each protective film [nm], ni is the refractive index of each protective film [nm], and λ is the wavelength of the laser light [nm]), and as to a second protective layer $$(k/2)-1/8 \leq \Sigma(dj/(\lambda/nj)) \leq (k/2)+1/8$$

(where k is an integer, j is a natural number, dj is the thickness of each protective film [nm], nj is the refractive index of each protective film [nm], and λ is the wavelength of the laser light [nm]).

Notably, there are other zones where both broken lines overlap than those indicated in FIGS. 8 to 10, to be exact. However, such zones are too narrow to provide a margin for fabricating an information recording medium. In addition, the difference in transmissivity is also so large in these zones that the effects of the fluctuation rate $\Delta Pr_2$, which is another restriction, prevent satisfactory performance.

EXAMPLES

Specific examples will be described below.

First Example

Referring to FIG. 1 again, the information recording medium according to the first example will further be described.

To prepare this information recording medium, first, the reflector film 3, the second dielectric film 22, the phase change recording film 2, the first dielectric film 21 were sequentially vacuum deposited by sputtering onto the 0.6 mm thick substrate 101, and then a UV curable resin was spin coated. Next, the first dielectric film 11, the phase change recording film 1, and the second dielectric film 12 were sequentially vacuum deposited by sputtering onto another 0.6 mm thick substrate for the light transmissive layer 103, and then the UV curable resin was spin coated. Successively, the entire surfaces of the phase change recording films 1 and 2 of the respective substrates were exposed to laser light to become crystalline, and the resulting substrates were then bonded together using the UV curable resin. The transparent layer 102 formed of the UV cured resin between the two information recording layers L1 and L2 is 40 μm thick.

The first dielectric film 11 corresponds to the first protective layer, and the second dielectric film 12 to the second protective layer.

The first dielectric film 11 of the first information recording layer L1 is made of $ZnS.SiO_2$ and is 220 nm thick. Its phase change recording film 1 is made of AgInSbTe and is 6 nm thick. Its second dielectric film 12 is made of $ZnS.SiO_2$ and is 260 nm thick.

The first dielectric film 21 of the second information recording layer L2 is made of $ZnS.SiO_2$ and is 160 nm thick. Its phase change recording film 2 is made of AgInSbTe and is 14 nm thick. Its second dielectric film 22 is made of $ZnS.SiO_2$ and is 30 nm thick. Its reflector film 3 is made of Al and is 100 nm thick.

The optical constants of the phase change recording films 1 and 2 of the first and second information recording layers L1 and L2 are: (nc, kc)=(1.5, 3.8) and (na, ka)=(2.9, 2.84). Therefore, (nc+3/2kc)−(na+3/2ka)=+0.04, and (nc−na)×(kc−ka)=−1.34, thus satisfying the previously mentioned condition.

Moreover, since the optical constant of the dielectric film $ZnS.SiO_2$ is 2.3, thickness/(λ/n) of the first dielectric film 11 of the first information recording layer L1 is $$220/(\lambda/2.3)=1.249$$

and thickness/(λ/n) of the second dielectric film 12 is $$260/(\lambda/2.3)=1.477$$

Hence, the previously mentioned condition is also satisfied.

The optical properties of the first and second information recording layers L1 and L2 are indicated below. It should be noted that the following reflectivities, light absorption coefficients, and light transmissivities are obtained on condition that the intensity of light entering the respective information recording layers is 100%. Thus, for the second information recording layer L2, the light has 100% intensity upon entrance into the layer L2 after having passed through the light transmissive layer and the first information recording layer.

| <Optical properties of first information recording layer> | |
|---|---|
| Crystalline portion: | |
| Reflectivity $R_{1c}$: | 11.2% |
| Light absorption coefficient $A_{1c}$: | 36.1% |
| Light transmissivity $T_{1c}$: | 52.6% |
| Amorphous portion: | |
| Reflectivity $R_{1a}$: | 1.7% |
| Light absorption coefficient $A_{1a}$: | 48.2% |
| Light transmissivity $T_{1a}$: | 50.1% |
| <Optical properties of second information recording layer> | |
| Crystalline portion: | |
| Reflectivity $R_{1c}$: | 40.3% |
| Amorphous portion: | |
| Reflectivity $R_{1a}$: | 15.5% |

Assuming that the area occupied by the recorded marks in the lands/grooves, i.e., the guide grooves of the first information recording layer L1 is 50% (Aa=0.5), the transmissivity for light transmitting through the recorded portions (lands/grooves) of the first information recording layer is 51.3%, and that for light transmitting through the unrecorded portions is 52.6%. Under this condition, the rate of fluctuation of the light for recording on the second information recording layer L2 is 2.4% and for reproducing from the same layer L2 is 4.8%, provided that the light has transmitted through the recorded portion of the first information recording layer L1.

Recording/reproducing experiments were carried out using a bluish purple laser beam having a wavelength of 405 nm, as to the information recording layers L1 and L2 of the information recording medium according to the first embodiment. Since the difference in transmissivity between the recorded and unrecorded portions of the first information recording layer L1 was small, the first embodiment allowed information signals to be recorded/reproduced satisfactorily also on/from the second information recording layer L2, independently of whether information is recorded or not on the first information recording layer L1.

Second Example

Referring to FIG. 2 again, the information recording medium according to the second example will further be described.

To prepare this information recording medium, first, the reflector film 3, the second dielectric film 22, the phase change recording film 2, and the first dielectric film 21 were sequentially vacuum deposited by sputtering onto the 0.6 mm thick substrate 101, and then the UV curable resin was spin coated. Next, the first dielectric film 11, the phase change recording film 1, the second dielectric film 12a, the third dielectric film 12b, and the fourth dielectric film 12c were sequentially vacuum deposited by sputtering onto another 0.6 mm thick substrate for the light transmissive layer 103, and then the UV curable resin was spin coated. Successively, the entire surfaces of the phase change recording films 1 and 2 of the respective substrates were exposed to laser light to become crystalline, and the resulting substrates were then bonded together using the UV curable resin. The transparent layer 102 formed of the UV cured resin between the two information recording layers L1A and L2 was 40 µm thick.

The first dielectric film 11 corresponds to the first protective layer, and a layer formed of the second to fourth dielectric films 12a to 12c corresponds to the second protective layer.

The first dielectric film 11 of the first information recording layer L1A is made of $ZnS.SiO_2$ and is 230 nm thick. Its phase change recording film 1 is made of AgInSbTe and is 6 nm thick. Its second dielectric film 12a is made of $ZnS.SiO_2$ and is 20 nm thick. Its third dielectric film 12b is made of AlN and is 180 nm thick. Its fourth dielectric film 12c is made of $ZnS.SiO_2$ and is 90 nm thick.

The first dielectric film 21 of the second information recording layer L2 is made of $ZnS.SiO_2$ and is 160 nm thick. Its phase change recording film 2 is made of AgInSbTe and is 14 nm thick. Its second dielectric film 22 is made of $ZnS.SiO_2$ and is 30 nm thick. Its reflector film 3 is made of Al and is 100 nm thick.

The optical constants of the phase change recording films 1 and 2 of the first and second information recording layers L1A and L2 are: $(n_c, k_c)=(1.5, 3.8)$ and $(n_a, k_a)=(2.9, 2.84)$. Therefore, $(n_c+3/2k_c)-(n_a+3/2k_a)=+0.04$, and $(n_c-n_a) \times (k_c-k_a)=-1.34$, thus satisfying the previously mentioned condition.

Moreover, since the optical constant of the dielectric film $ZnS.SiO_2$ is 2.3 and that of AlN is 1.95, thickness/$(\lambda/n)$ of the first dielectric film 11 of the first information recording layer L1A is $$230/(\lambda/2.3)=1.306$$

and the sum of the values (thickness/$(\lambda/n)$) of the second to fourth dielectric films 12a to 12c is $$20/(\lambda/2.3)+180/(\lambda/1.95)+90/(\lambda/2.3)=1.49$$

Hence, the previously mentioned condition is also satisfied.

The optical properties of the first and second information recording layers L1A and L2 are indicated below. It should be noted that the following reflectivities, light absorption coefficients, and light transmissivities are obtained on condition that the intensity of light entering the respective information recording layers is 100%. Thus, for the second information recording layer L2, the light has 100% intensity upon entrance into the layer L2 after having passed through the light transmissive layer and the first information recording layer L1A.

| <Optical properties of first information recording layer> | |
|---|---|
| Crystalline portion: | |
| Reflectivity $R_{1c}$: | 11.2% |
| Light absorption coefficient $A_{1c}$: | 32.7% |
| Light transmissivity $T_{1c}$: | 56.1% |
| Amorphous portion: | |
| Reflectivity $R_{1a}$: | 2.7% |
| Light absorption coefficient $A_{1a}$: | 43.6% |
| Light transmissivity $T_{1a}$: | 53.6% |
| <Optical properties of second information recording layer> | |
| Crystalline portion: | |
| Reflectivity $R_{1c}$: | 40.3% |
| Amorphous portion: | |
| Reflectivity $R_{1a}$: | 15.5% |

Assuming that the area occupied by the recorded marks in the lands/grooves, i.e., the guide grooves of the first information recording layer L1A is 50% (Aa=0.5), the transmissivity for light transmitting through the recorded portions (lands/grooves) of the first information recording layer is 54.9%, and that for light transmitting through its unrecorded portions is 56.1%. Under this condition, the rate of fluctuation of the light for recording on the second information recording layer L2 is 2.2% and for reproducing from the same layer L2 is 4.5%, provided that the light has transmitted through the recorded portion of the first information recording layer L1A.

Recording/reproducing experiments were carried out using the bluish purple laser beam having a wavelength of 405 nm, as to the information recording layers L1A and L2 of the information recording medium according to the second embodiment. Since the difference in transmissivity between the recorded and unrecorded portions of the first information recording layer L1A was small, the second embodiment allowed information to be recorded/reproduced satisfactorily also on/from the second information recording layer L2, independently of whether information is recorded or not on the first information recording layer L1A.

Third Example

Referring to FIG. 3 again, the information recording medium according to the third example will further be described.

To prepare this information recording medium, first, the reflector film 3, the second dielectric film 22, the phase change recording film 2, and the first dielectric film 21 were sequentially vacuum deposited by sputtering onto the 0.6 mm thick substrate 101, and then the UV curable resin was spin coated. Next, the first dielectric film 11a, the second dielectric film 11b, the third dielectric film 11c, the phase change recording film 1, the fourth dielectric film 12d, the fifth dielectric film 12e, and the sixth dielectric film 12f were sequentially vacuum deposited by sputtering onto another 0.6 mm thick substrate for the light transmissive layer 103, and then the UV curable resin was spin coated. Successively, the entire surfaces of the phase change recording films 1 and 2 of the respective substrates were exposed to laser light to become crystalline, and the resulting substrates were then bonded together using the UV curable resin. The transparent layer 102 formed of the UV cured resin between the two information recording layers L1B and L2 is 40 μm thick.

A layer formed of the first to third dielectric films 11a to 11c corresponds to the first protective layer, and a layer formed of the fourth to sixth dielectric films 12d to 12f corresponds to the second protective layer.

The first dielectric film 11a of the first information recording layer L1B is made of ZnS.SiO$_2$ and is 90 nm thick. Its second dielectric film 11b is made of AlN and is 110 nm thick. Its third dielectric film 11c is made of ZnS.SiO$_2$ and is 90 nm thick. Its phase change recording film 1 is made of AgInSbTe and is 6 nm thick. Its fourth dielectric film 12d is made of ZnS.SiO$_2$ and is 40 nm thick. Its fifth dielectric film 12e is made of AlN and is 100 nm thick. Its sixth dielectric film 12f is made of ZnS.SiO$_2$ and is 50 nm thick.

The first dielectric film 21 of the second information recording layer L2 is made of ZnS.SiO$_2$ and is 160 nm thick. Its phase change recording film 2 is made of AgInSbTe and is 14 nm thick. Its second dielectric film 22 is made of ZnS.SiO$_2$ and is 30 nm thick. Its reflector film 3 is made of Al and is 100 nm thick.

The optical constants of the phase change recording films 1 and 2 of the first and second information recording layers L1B and L2 are: (nc, kc)=(1.5, 3.8) and (na, ka)=(2.9, 2.84). Therefore, (nc+3/2kc)−(na+3/2ka)=+0.04, and (nc−na)×(kc−ka)=−1.34, thus satisfying the previously mentioned condition.

Moreover, since the optical constant of the dielectric film ZnS.SiO$_2$ is 2.3 and that of AlN is 1.95, the sum of the values (thickness/(λ/n)) of the first to third dielectric films 11a to 11c of the first information recording layer L1B is $$90/(\lambda/2.3)+110/(\lambda/1.95)+90/(\lambda/2.3)=1.02679$$

and the sum of the values (thickness/(λ/n)) of the fourth to sixth dielectric films 12d to 12f is $$40/(\lambda/2.3)+100/(\lambda/1.95)+50/(\lambda/2.3)=0.9926.$$

Hence, the previously mentioned condition is also satisfied.

The optical properties of the first and second information recording layers L1B and L2 are indicated below. It should be noted that the following reflectivities, light absorption coefficients, and light transmissivities are obtained on condition that the intensity of light entering the respective information recording layers is 100%. Thus, for the second information recording layer L2, the light has 100% intensity upon entrance into the layer L2 after having passed through the light transmissive layer and the first information recording layer L1B.

<Optical properties of first information recording layer>

Crystalline portion:

| | |
|---|---|
| Reflectivity $R_{1c}$: | 11.3% |
| Light absorption coefficient $A_{1c}$: | 36.1% |
| Light transmissivity $T_{1c}$: | 52.6% |

Amorphous portion:

| | |
|---|---|
| Reflectivity $R_{1a}$: | 1.8% |
| Light absorption coefficient $A_{1a}$: | 48.0% |
| Light transmissivity $T_{1a}$: | 50.2% |

<Optical properties of second information recording layer>

Crystalline portion:

| | |
|---|---|
| Reflectivity $R_{1c}$: | 40.3% |

Amorphous portion:

| | |
|---|---|
| Reflectivity $R_{1a}$: | 15.5% |

Assuming that the area occupied by the recorded marks in the lands/grooves, i.e., the guide grooves of the first information recording layer L1B is 50% (Aa=0.5), the transmissivity for light transmitting through the recorded portions (lands/grooves) of the first information recording layer is 51.4%, and that for light transmitting through its unrecorded portions is 52.6%. Under this condition, the rate of fluctuation of the light for recording on the second information recording layer L2 is 2.4% and for reproducing from the same layer L2 is 4.8%, provided that the light has transmitted through the recorded section of the first information recording layer L1B.

Recording/reproducing experiments were carried out using the bluish purple laser beam having a wavelength of 405 nm, as to the information recording layers L1B and L2 of the information recording medium according to the third embodiment. Since the difference in transmissivity between the recorded and unrecorded portions of the first information recording layer L1B was small, the third embodiment allowed information signals to be recorded/reproduced satisfactorily also on/from the second information recording layer L2, independently of whether information is recorded or not on the first information recording layer L1B.

As an alternative to the phase change recording film satisfying $R_{c2}>R_{a2}$ used for the second information recording layer in each of the above embodiments, a so-called reversible phase change recording film satisfying $R_{c2}<R_{a2}$ may be used. As other alternatives, the second information recording layer may be reproducible only (ROM) and magneto-optic. There is no limitation as to how information signals are recorded/reproduced on/from the second information recording layer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-23195 filed on Jan. 31, 2001 including the specification, claims, drawings and summary is incorporated herein by reference in its entirety.

What is claimed is:

1. An information recording medium having a light transmissive layer, a first information recording layer, a transparent layer, and a second information recording layer sequentially stacked to reproduce information signals upon exposure of said light transmissive layer to laser light, wherein said first information recording layer comprises a first protective layer, a phase change recording film, and a second protective layer sequentially from said light transmissive layer, and the rate of power fluctuation between a reproducing light passing through a recorded region of said first information recording layer and that passing through an unrecorded region of said first information recording layer, during reproduction of the information signals from said second information recording layer are within 10%.

2. The information recording medium according to claim 1, wherein assuming that a percentage of an area occupied by recorded marks in the recorded region of said first information recording layer is Aa, then $0.2 \leq Aa \leq 0.5$.

3. The information recording medium according to claim 1, wherein assuming that a transmissivity of the recorded region of said first information recording layer is Tr, then $0.3 \leq Tr \leq 0.8$ and assuming that a transmissivity of the unrecorded region of said first information recording layer is Tnr, then $0.3 \leq Tnr \leq 0.8$.

4. The information recording medium according to claim 1, said medium having a light transmissive layer, a first information recording layer, a transparent layer, and a second information recording layer sequentially stacked to reproduce information signals upon exposure of said light transmissive layer to laser light, wherein said first information recording layer comprises a first protective layer, a phase change recording film, and a second protective layer sequentially from said light transmissive layer, and assuming that a refractive index and an extinction coefficient of a crystalline portion of said phase change recording film are $n_{1c}$ and $k_{1c}$, respectively, and that a refractive index and an extinction coefficient of an amorphous portion of said phase change recording film are $n_{1a}$ and $k_{1a}$, respectively, then $(n_{1c}-n_{1a}) \times (k_{1c}-k_{1a}) < 0$ and $|(n_{1c}+3/2 \times k_{1c})-(n_{1a}+3/2 \times k_{1a})| \leq 2$.

5. The information recording medium according to claim 1, said medium having a light transmissive layer, a first information recording layer, a transparent layer, and a second information recording layer sequentially stacked to reproduce information signals upon exposure of said light transmissive layer to laser light, wherein said first information recording layer comprises a first protective layer, a phase change recording film, and a second protective layer sequentially from said light transmissive layer, and assuming that a number of protective films constituting said first protective layer is I, a thickness of each of said protective films is di [nm] (where i is a natural number), a refractive index of each of said protective films is ni, a wavelength of the laser light is λ [nm], and m is an integer, then a sum Σ for all i running from 1 to I is given substantially as $(m/2+1/4)-1/8 \leq \Sigma(di/(\lambda/ni)) \leq (m/2+1/4)+1/8$ and assuming that a number of protective films constituting said second protective layer is J, a thickness of each of said protective films is dj [nm] (where j is a natural number), a refractive index of each of said protective films is nj, and k is an integer, then a sum Σ for all j running from 1 to J is given substantially as $(k/2)-1/8 \leq \Sigma(dj/(\lambda/nj)) \leq (k/2)+1/8$.

6. The information recording medium according to claim 1, said medium having a light transmissive layer, a first information recording layer, a transparent layer, and a second information recording layer sequentially stacked to reproduce information signals upon exposure of said light transmissive layer to laser light, wherein said first information recording layer comprises a first protective layer, a phase change recording film, and a second protective layer sequentially from said light transmissive layer, and assuming that a number of protective films constituting said first protective layer is I, a thickness of each of said protective films is di [nm] (where i is a natural number), a refractive index of each of said protective films is ni, a wavelength of the laser light is λ [nm], and m is an integer, then a sum Σ for all i running from 1 to I is given substantially as $(m/2+1/4)-1/8 \leq \Sigma(di/(\lambda/ni)) \leq (m/2+1/4)+1/8$ and assuming that a number of protective films constituting said second protective layer is J, a thickness of each of said protective films is dj [nm] (where j is a natural number), a refractive index of each of said protective films is nj, and k is an integer, then a sum Σ for all j running from 1 to J is given substantially as $(k/2)-1/8 \leq \Sigma(dj/(\lambda/nj)) \leq (k/2)+1/8$ and assuming that a refractive index and an extinction coefficient of a crystalline portion of said phase change recording film are $n_{1c}$ and $k_{1c}$, respectively, and that a refractive index and an extinction coefficient of an amorphous portion of said phase change recording film are $n_{1a}$ and $k_{1a}$, respectively, then $(n_{1c}-n_{1a}) \times (k_{1c}-k_{1a}) < 0$ and $|(n_{1c}+3/2 \times k_{1c})-(n_{1a}+3/2 \times k_{1a})| \leq 2$.

* * * * *